Oct. 7, 1958  C. VAN DER LELY ET AL  2,854,810
ROTARY STRIPPER FOR SIDE DELIVERY RAKING WHEEL TINES
Filed July 6, 1956  2 Sheets-Sheet 1

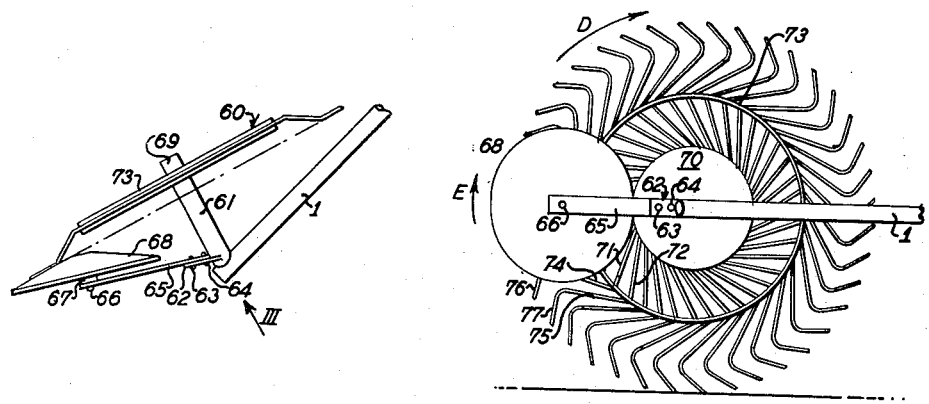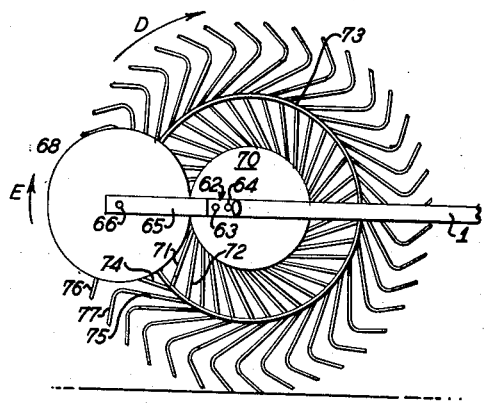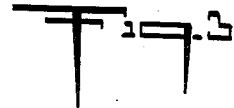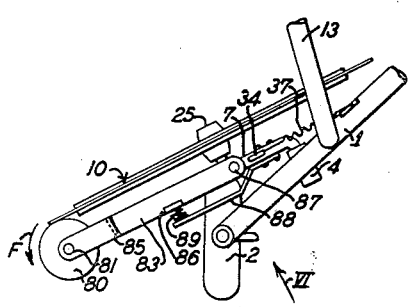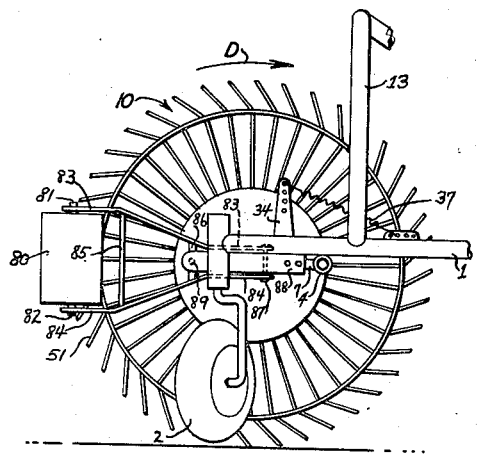

United States Patent Office 2,854,810
Patented Oct. 7, 1958

2,854,810

ROTARY STRIPPER FOR SIDE DELIVERY RAKING WHEEL TINES

Cornelis van der Lely and Ary van der Lely, Maasland, Netherlands, assignors to C. van der Lely N. V., Maasland, Netherlands, a Dutch limited liability company Application July 6, 1956, Serial No. 596,270

Claims priority, application Netherlands July 14, 1955

22 Claims. (Cl. 56—377)

The present invention relates to a device for laterally displacing material, such as hay and the like, lying on the ground and provided with at least one rotatable rake wheel having a substantially vertical plane of rotation.

Devices of this kind are generally known and in said devices it is desirable that the rising part of the rake wheel drop the material previously engaged. In certain circumstances, however, the difficulty arises that the material adheres to the outer periphery of the rake wheel, due to which the material passes over the rake wheel and the efficiency of the device is decreased. In a side delivery rake, the material passed over the rake wheel is left behind. Further, there is a possibility that the material will wind itself round the axle of the rake wheel, in which case the rotation of the rake wheel is hampered.

It is an object of the present invention to overcome such difficulties and, according to the invention, a member which is freely rotatable about an axle is provided in cooperative arrangement with the tines of an associated rake wheel so that the crop is stripped from said tines.

In accordance with a feature of the invention, it is advantageous to keep the angle between the axle of the rotatable member and the axle of the rake wheel small, because the rotatable member then cooperates with the tines of the rake wheel over a greater parts of its circumference.

Other advantages will appear in the following description and the annexed drawing wherein:

Fig. 3 is a plan view of a part of a device according to another embodiment of the invention and in which the rake wheels are mounted on fixedly attached axles and are provided with tines having a special shape.

Fig. 4 is a side view of the part shown in Fig. 3 viewed in the direction of arrow IV.

Fig. 5 represents a plan view of a part of a device which constitutes another embodiment of the invention.

Fig. 6 is a side view of the device of Fig. 5 viewed in the direction of arrow VI.

Figure 1:
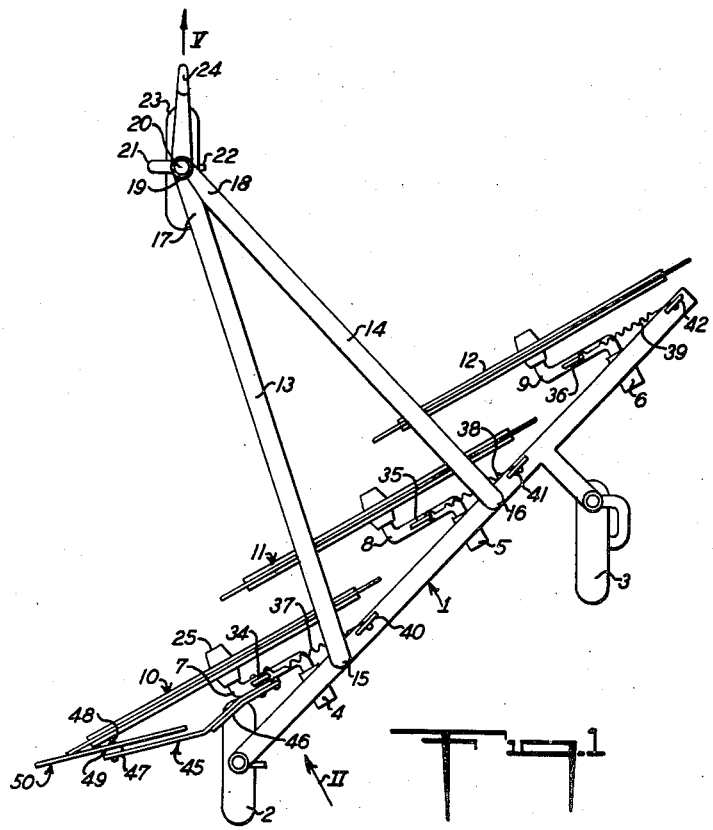
Fig. 1 is a plan view of a device provided according to one embodiment of the invention.
Figure 2:
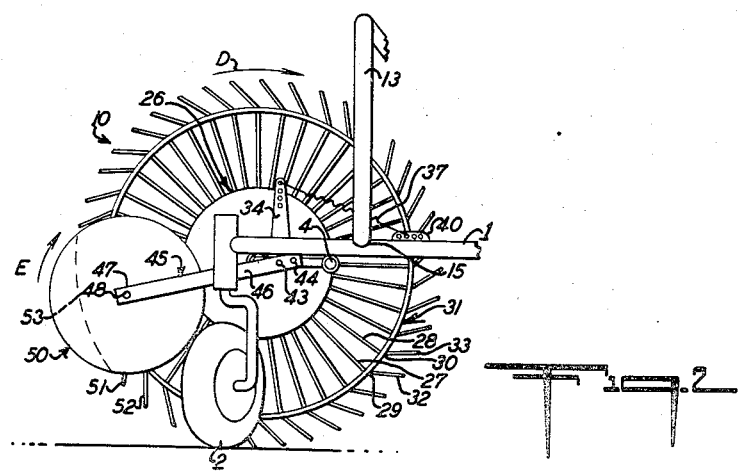
Fig. 2 is a side view of a part of the device viewed in the direction of arrow II in Fig. 1.

The device shown in Figs. 1 and 2 is a side delivery rake which includes a frame beam or mobile frame 1 supported by a running wheel 2 which is directionally adjustable and by a self-adjusting running wheel 3. The frame beam 1 is provided with horizontal bearings 4, 5 and 6 in which cranks 7, 8 and 9 are supported. Rake wheels 10, 11 and 12 preferably having a diameter of less than one meter are mounted so as to be freely rotatable on said cranks. Two bows 13 and 14 are connected to the frame beam 1 at 15 and 16. These bows extend over the rake wheels 10, 11 and 12 and the front ends 17 and 18 of said bows are connected to a vertical tube 19 in which a vertical axle 20 is rotatable. The lower end of the axle 20 is attached to the horizontal axle 22 of a third running wheel 23 by means of a bar 21, the direction of said running wheel being defined by the direction of a draw hook 24 which is fixedly attached to the axle 20.

The rake wheels 10, 11 and 12 have identical construction as is next more fully described with reference to the rake wheel 10. The hub 25 of the rake wheel 10 carries a flat disc 26 to which is attached a large number of spokes, such as spokes 27 and 28, constituted by steel wires. Said spokes are put through apertures, such as apertures 29 and 30, in a rim 31 and their extremities, such as extremities 32 and 33, constitute the tines of the rake wheel 10 and project outwardly from the rim 31. In close proximity to the rim 31, each steel wire constituting a spoke and a tine is bent sharply, due to which the spokes extend radially, but the tines do not. These bends keep the rim 31 centered with regard to the disc 26.

Each crank 7, 8 and 9 carries a vertical arm 34, 35 or 36, the free upper end of which is coupled to a perforated projection 40, 41 or 42 by means of a spring 37, 38 or 39 for decreasing the pressure of the rake wheels 10, 11 and 12 on the ground. Moreover, two leaf springs 45 and 46 are mounted on the crank 7 by means of bolts 43 and 44, the spring 46 supporting the longer spring 45. The end 47 of the spring 45 carries a pin or axle 48 on which a hub 49 of a plate-shaped disc 50 is mounted so as to be freely rotatable, said disc 50 being pressed resiliently and lightly against the tines of the rake wheel 10 (such as, for example, the tines 51 and 52) by means of the springs 45 and 46. Less than half of the circumference of disc 50 lies outside of the circumference of rake wheel 10.

In operation, the device is pulled forward in the direction of arrow V in Fig. 1. The rake wheels 10, 11 and 12 rotate in the same direction as is indicated for the rake wheel 10 by arrow D in Fig. 2. When the rake wheels 10, 11 and 12 engage material lying on the ground, the material is delivered to the left by each wheel such that the material delivered to the left by the rake wheel 12 is further delivered laterally by the rake wheel 11 and so forth. Thus, the rake wheel 10 delivers the greatest amount of material. Moreover, the latter rake wheel 10 is in the least favorable position, because its upward moving tines are in contact with the largest amount of material.

The material is left behind on the field by the rake wheel 10 but tends to move back slightly in a lateral direction behind this wheel. Thus, the tines of wheel 10 are enclosed by material at the front as well as at the rear of the wheel. Consequently, tines 51 and 52 (in the illustrated position) have to free themselves from a considerable amount of material. As noted above, the tines 51 and 52 rest with a light pressure (depending on the stiffness of said tines and the initial tension and the elasticity of the springs 45 and 46) against the edge of disc 50. The disc 50 strips the material adhering to said tines from these tines. The points of the tines describe at the front of the disc 50 a path 53, due to which the disc 50 rotates in the direction shown by arrow E in Fig. 2. Due to this, the material is not only stripped from the tines by a portion of the disc which is moving upwardly but is pushed to the left at the same time. This is advantageous of course, but not too much should be expected of the disc 50 in this respect, so that it is preferable to provide the disc 50 with an edge which is smooth or at best slightly milled. According to the invention, the rake wheels 11 and 12 can be equipped with stripping discs as described for the rake wheel 10.

The rake wheel 60 shown in Figs. 3 and 4 is rotatable about an axle 61 which can be mounted rigidly on the frame beam 1 of Fig. 1 in which case the axles of wheels 11 and 12 will also preferably be rigidly connected to the frame beam 1.

The axle 61 supports a lip 62 to which a strip 65 of spring steel is attached by means of bolts 63 and 64.

the free extremity of said strip supports a pin or axle 66 about which the hub 67 of a conical disc 68 is freely rotatable. The rake wheel comprises a hub 69 which is freely rotatable about the axle 61, and a disc 70 is mounted on the wheel, to which disc are attached a large number of spokes, such as spokes 71 and 72, of steel wire. Said spokes define a rather great angle with respect to the radial direction and lie in a plane perpendicular to the axle 60. In this plane is situated a perforated rim 73 through which the spokes are inserted. The steel wires constituting the spokes are bent rather sharply outside the rim 73, and said rim 73 is thus centered. The prolongation of each spoke outside of the rim, such as the prolongations 74 and 75 of the spokes 71 and 72, constitute supporting members for the actual tines, such as tines 76 and 77. Each tine is substantially parallel to the associated spoke. Therefore, the tines are situated in a plane perpendicular to the axle 61. The supporting members, such as members 74 and 75, make, however, an angle with the plane of the rim 73 and extend somewhat rearwardly of said rim. It will be clear that the tines can readily move rearwardly by rotation about the associated spokes together with the supporting members, the spokes being subjected to torsion during said rotation.

With the tines moving rearwardly, they can cooperate more efficiently with the conical stripping disc 68 than with a flat disc for, with a flat disc, the tines may be caught by the disc and thus prevent the rake wheel from rotating. In operation the rake wheel 60 rotates in the direction indicated by the arrow D in Fig. 4, whereas the disc 68 rotates in the direction indicated by arrow E. The lower portion of the disc 68 strips the crop from the tines.

In the further embodiment shown in Figs. 5 and 6, the rake wheel has the construction and is mounted in the same way as the rake wheel 10 of Figs. 1 and 2. Thus, the rake wheel, its crank, its bearing and the associated frame beam in Figs. 5 and 6 are indicated by the same reference numerals as in Figs. 1 and 2. However, the disc 50 is replaced by a cylindrical member or roller 80 provided with two pins 81 and 82 defining an axis of rotation for said cylindrical member and supported on two strips 83 and 84. The strips 83 and 84 are interconnected by two vertical strips 85 and 86 and the strips 83 and 84 are freely rotatable about the ends of a substantially vertical pin 87 which is rigidly connected to the crank 7. A strip 88 is further rigidly connected to the crank 7. A weak compression spring 89 is mounted between the left end of the strip 88 and the central part of the strip 86. Thus, the roller 80 rests lightly against the tines of the rake wheel 10.

In operation, the wheel 10 rotates in the direction indicated by arrow D in Fig. 6 and the roller 80 rotates in the direction indicated by arrow F in Fig. 5, the first movement being caused by the rake wheel coming into contact with the ground or the material lying on it, and the second movement resulting from the movement of the material along the roller. During its rotation, the roller strips the crop from the upwardly moving tines, such as the tine 51 in Fig. 6.

There will now be obvious to those skilled in the art many modifications of the structures set forth. These modifications will, however, not depart from the spirit of the invention as defined in the following claims.

What is claimed is:

1. A device for laterally displacing material lying on the ground comprising: a mobile frame, at least one rotatable rake wheel including tines for displacing the material, said rake wheel being mounted on said frame, an axle mounted on said frame and a stripping member mounted on and freely rotatable about said axle said axle supporting said stripping member in juxtaposition to said rake wheel for frictionally engaging the same and being driven thereby to strip the material from the rake wheel.

2. A device as defined in claim 1, in which the stripping member is in engagement with the tines of the rake wheel.

3. A device as defined in claim 1, in which the stripping member is located to one side of the rake wheel.

4. A device as defined in claim 1, wherein the rake wheel defines an axis of rotation and in which the axle of the stripping member and the axis of the rake wheel define an angle of approximately 45° with each other.

5. A device as defined in claim 1, wherein said rake wheel defines a plane and an axis of rotation and in which a prolongation of the axle of the stripping member intersects the plane of the rake wheel between the axis of rotation of the rake wheel and the circumference.

6. A device as defined in claim 5, in which less than half of the stripping member is located outside the circumference of the rake wheel.

7. A device as defined in claim 1, in which the stripping member comprises a plate-shaped disc.

8. A device as defined in claim 7, wherein the disc is vertically mounted and in which the disc includes a lower portion in cooperational relation with the tines of the rake wheel.

9. A device as defined in claim 7, in which a side of the disc is in contact with the tines of the rake wheel.

10. A device as defined in claim 7, in which the portion of the disc which is in contact with the tines is arranged for an upward movement.

11. A device as defined in claim 7, in which the circumference of the disc is smooth.

12. A device as defined in claim 1 in which the tines of the rake wheel are resilient to accommodate large deviations in an axial direction, the stripping member consisting of a conical body.

13. A device as defined in claim 1 in which the stripping member comprises a cylindrical body.

14. A device as defined in claim 13, in which the axis of rotation of the cylindric body is substantially vertical and parallel to the plane of the rake wheel.

15. A device as defined in claim 13, in which the cylindrical body projects outside the circumference of the rake wheel and is supported for being put into rotation by material moving along the rake wheel.

16. A device as defined in claim 1, comprising resilient means coupling the stripping member to the frame, the stripping member being supported on the axle for deflection in a direction parallel to the axis of the rake wheel.

17. A device for laterally displacing material lying on the ground comprising: a mobile frame, a plurality of rake wheels arranged in a row and mounted on said frame, each rake wheel including tines for displacing the material and adjacent rake wheels being in overlapping and cooperational relation, and a stripping member mounted and freely rotatable on said frame in juxtaposition to the tines of the rearmost rake wheel of said row of rake wheels, no more than one stripping member being provided for all of the rake wheels of said row.

18. A device for laterally displacing material lying on the ground comprising a mobile frame, at least one rotatable rake wheel operatively associated with said frame and including tines for displacing the material, and a stripping member operatively associated with said rake wheel, said stripping member having a position adjacent and in contact with the tines of the rake wheel.

19. A device as defined in claim 18, wherein during rotation of the wheel, the tines first contact the stripping member closer to the center of the rake wheel than to the circumference of the rake wheel.

20. In a raking implement: at least one frame-supported rotatable rake wheel, a movable stripper element operatively associated with said wheel, and a support supporting said element in contact with said rake wheel and material thereupon for restricted movement in response to the rotation of said rake wheel, said wheel driving said element.

21. Apparatus as claimed in claim 20 wherein said rake wheel constitutes a frictional drive for said movable element.

22. Apparatus as claimed in claim 20 wherein said rake wheel and movable element are circular elements of different diameter and defining spaced axes of rotation, said movable element having the smaller diameter, said rake wheel constituting a frictional drive for the movable element whereby the wheel and element rotate in the same rotational direction, at least a portion of the element in contact with the wheel moving outwardly relative to the axis of the wheel to displace material therefrom.

References Cited in the file of this patent
UNITED STATES PATENTS

| | | |
|---|---|---|
| 2,451,402 | Myers | Oct. 12, 1948 |
| 2,641,895 | Richey | June 16, 1953 |
| 2,712,723 | Ryan | July 12, 1955 |